United States Patent Office 3,271,424
Patented Sept. 6, 1966

3,271,424
16α-METHYL PROGESTERONES
Irving Scheer, Somerville, and Robert Arthur Mallory, Branchburg Township, Somerset County, N.J., assignors to Ortho Pharmaceutical Corporation, a corporation of New Jersey
No Drawing. Filed Apr. 23, 1964, Ser. No. 362,176
3 Claims. (Cl. 260—397.3)

This invention relates to 6α,16α-dimethylprogesterones and 16α-methyl progesterones.

The compounds of the present invention may be represented by the following structural formula:

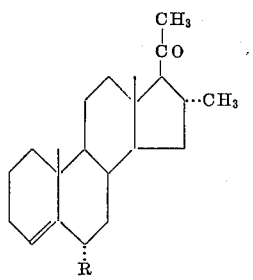

wherein R is hydrogen or methyl.

The compounds of the present invention are oral antiovulatory agents. They are also useful intermediates in the preparation of other steroids.

The compounds of the present invention may be prepared according to the following reaction sequence:

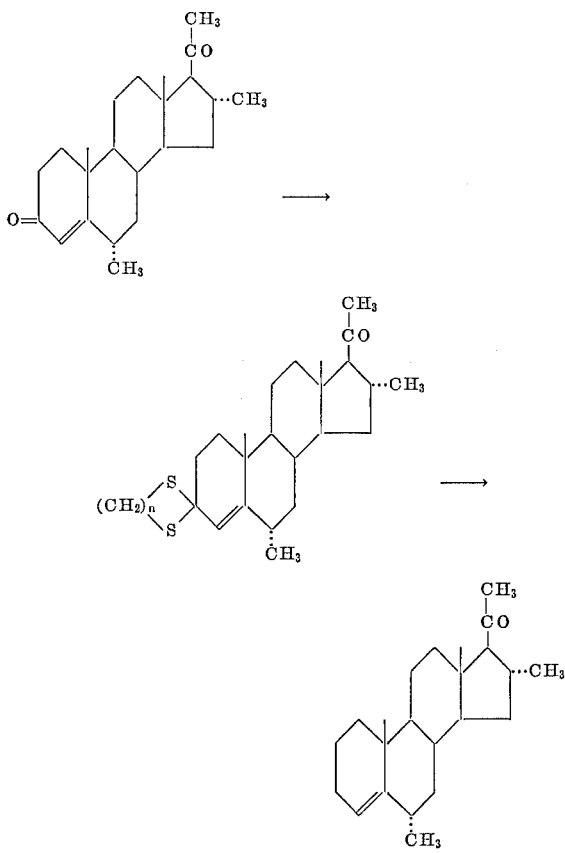

6α,16α-dimethylprogesterone is treated with an alkyldithiol such as ethanedithiol, 1,2 propanedithiol or 1,3 propanedithiol in the presence of a catalyst, such as pyridine hydrochloride to yield the 3-alkylene thioketal. The 3-alkylene thioketal is then removed from the structure by reduction with active Raney nickel.

The same reaction sequence is applicable for the preparation of the 6-desmethyl compounds starting with 16α-methyl progesterone.

The following examples illustrate the manner in which the products of this invention may be prepared, but are not intended to limit the invention in any respect.

Example I.—6α,16α-dimethyl-4-pregnene-3,20-dione 3-ethylenethioketal

A mixture of 5 g. 6α,16α-dimethyl-4-pregnene-3,20-dione, 5 g. pyridine monohydrochloride, and 4 ml. ethanedithiol in 10 ml. methanol is stirred at 25° C. for ten minutes. The now clear solution is maintained at 25° C. for one hour during which time a crystalline precipitate is formed. The crystals are collected by filtration and washed with cold methanol to yield 5.2 g. of 6α,16α-dimethyl-4-pregnene-3,20-dione 3-ethylenethioketal melting at 153–155° C. A recrystallized sample melted at 156-157° C.

Analysis.—Calcd. for $C_{25}H_{38}OS_2$: C, 71.71; H, 9.15. Found: C, 71.77; H, 9.20.

By carrying out the same reaction with 1,2-propanedithiol, instead of ethanedithiol, 6α,16α-dimethyl-4-pregnene-3,20-dione 3-trimethylenethioketal is prepared.

Example II.—6α,16α-dimethyl-4-pregnen-20-one

A mixture of 4.5 g. 6α,16α-dimethyl-4-pregnene-3,20-dione 3-ethylenethioketal and 83 g. active Raney nickel catalyst in 850 ml. 95% ethanol is refluxed with stirring for two hours. The reaction mixture is cooled and filtered. The collected nickel catalyst is washed with 1 l. 95% ethanol. The combined filtrate and washings are concentrated in vacuo to dryness. The residue thus obtained is dissolved in methylene chloride and washed several times with water to remove nickel salts. The methylene chloride solution is dried over magnesium sulfate and concentrated to dryness in vacuo. The crude solid residue is crystallized from methanol to yield 2.7 g. of 6α,16α-dimethyl-4-pregnen-20-one, M.P. 106–108° C. Further recrystallization furnished an analytically pure sample, M.P. 109.5–110° C.

Analysis.—Calcd. for $C_{23}H_{36}O$: C, 84.08; H, 11.05. Found: C, 83.79; H, 11.16.

6α,16α-dimethyl-4-pregnen-20-one may also be prepared by the same procedure from 6α,16α-dimethyl-4-pregnene-3,20-dione 3-trimethylenethioketal.

Example III.—6α,16α-dimethyl-4-pregnen-20-one 3-trimethylenethioketal

A mixture of 5 g. 6α,16α-dimethylprogesterone, 2 ml. of 1,3-propanedithiol, 5 ml. of 0.68 M. hydrogen chloride-in-ethyl ether, and 50 ml. of methanol is stirred at 25° C. for one-half hour and then it is diluted with 300 ml. of water. After concentration under vacuum to remove ether and methanol, the tacky product is extracted with methylene chloride. The residue from concentration of the methylene chloride solution is developed onto a chromatographic column of neutral alumina and eluted with ether-hexane to afford a total of 3.1 g. of crystalline crude thioketal. Recrystallization from ether affords 2.7 g. of 6α,16α-dimethyl-4-pregnen-20-one 3-trimethylenethioketal as large colorless granules which melt at 137–138° C.

*Analysis.*—Calcd. for $C_{26}H_{40}OS_2$: C, 72.20; H, 9.32. Found: C, 71.95; H, 9.34.

*Example IV.—16α-methyl-4-pregnen-20-one*

A mixture of 3.0 g. of 16α-methylprogesterone, 3.0 g. of pyridine hydrochloride, and 2.5 ml. of ethanedithiol in 30 ml. of methanol is stirred at 25° C. for two hours and then at 0° C. for one-half hour. The crystalline white solid is filtered off, dried in air, and recrystallized from methylene chloride-acetone to afford 3.4 g. of 16α-methylprogesterone 3-ethylenethioketal as fine white prisms which melt at 185–186° C.

This thioketal is added to a suspension of three teaspoons (approximately 33 g.) of Raney nickel catalyst in 300 ml. of methanol and the mixture is refluxed with stirring under a nitrogen atmosphere for two hours. After cooling, the catalyst is removed by filtration and the methanolic filtrate is concentrated under vacuum. The oily residue is dissolved in ether, washed with water, and the ether solution is reconcentrated. The residue is now recrystallized from methanol to afford 1.8 g. of 16α-methyl-4-pregnen-20-one as white prisms which melt at 88–89° C.

*Analysis.*—Calcd. for $C_{22}H_{34}O$: C, 84.01; H, 10.90. Found: C, 83.78; H, 11.15.

What is claimed is:
1.

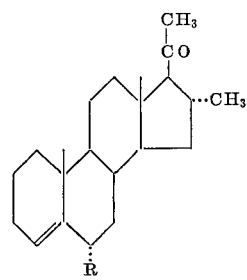

wherein R is selected from the group consisting of methyl and hydrogen.
2. 6α,16α-dimethyl-4-pregnen-20-one.
3. 16α-methyl-4-pregnen-20-one.

References Cited by the Examiner
UNITED STATES PATENTS
3,162,629  12/1964  Scheer _____ 260—239.5
3,168,536  2/1965  Kirk et al. _____ 260—397.3

OTHER REFERENCES
Marker et al., "J. Amer. Chem. Soc.," vol. 64, June 1942, pp. 1280–1281.

LEWIS GOTTS, *Primary Examiner.*
ELBERT L. ROBERTS, *Examiner.*
JOHNNIE R. BROWN, *Assistant Examiner.*